United States Patent
Lee

(10) Patent No.: US 6,467,600 B2
(45) Date of Patent: Oct. 22, 2002

(54) AUTOMOTIVE PARKING MECHANISM FOR AUTOMATIC TRANSMISSION

(75) Inventor: Yong-Hoon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 09/738,149

(22) Filed: Dec. 15, 2000

(65) Prior Publication Data

US 2001/0006129 A1 Jul. 5, 2001

(30) Foreign Application Priority Data

Dec. 30, 1999 (KR) .............................. 99-66740

(51) Int. Cl.$^7$ ................................................ B60T 1/06
(52) U.S. Cl. ....................... 192/219.5; 188/31
(58) Field of Search .......................... 192/219.5, 219.4; 188/31, 60, 69; 74/577 R, 577 S

(56) References Cited

U.S. PATENT DOCUMENTS

| | | | | |
|---|---|---|---|---|
| 3,001,618 A | * | 9/1961 | McCordic et al. | ........ 192/219.5 |
| 3,300,001 A | * | 1/1967 | Stockton | ................... 192/219.5 |
| 3,491,862 A | * | 1/1970 | Tanzer | ...................... 192/219.5 |
| 3,703,941 A | * | 11/1972 | Ohie et al. | ...................... 188/31 |
| 6,279,713 B1 | * | 8/2001 | Young et al. | .................. 188/31 |

\* cited by examiner

Primary Examiner—Saul Rodriguez
(74) Attorney, Agent, or Firm—Christie, Parker & Hale, LLP

(57) ABSTRACT

A parking mechanism for an automatic transmission includes a manual control shaft rotationally supported by a transmission housing, the manual control shaft cooperating with a shift lever, a detent plate mounted on the manual control shaft, an annulus gear formed on a transfer gear of the transmission, and a sprag interposed between the detent plate and the annulus gear, the sprag pivoting a fulcrum shaft which is fixed to the transmission housing.

14 Claims, 4 Drawing Sheets

AUTOMOTIVE PARKING MECHANISM FOR AUTOMATIC TRANSMISSION

CROSS-REFERENCE TO RELATED APPLICATION

This application claims priority of Korea patent Application No. 99-66740, filed on Dec. 30, 1999.

BACKGROUND OF THE INVENTION (a) Field of the Invention

The present invention relates to a parking mechanism for a vehicle equipped with an automatic transmission.

(b) Description of the Related Art

Typically, automatic transmissions for vehicles use planetary gear mechanisms or continuously variable gear mechanism as driving torque transmission means. Such an automatic transmission is selected and placed into any desired range, such as forward ranges, a reverse range, a neutral range and a parking range, by means of a shift lever manipulated by a driver. A selection of parking range causes a parking mechanism to lock a transmission shaft of the automatic transmission.

FIG. 6 schematically shows a conventional parking mechanism. This parking mechanism comprises a detent plate 100 rotated by operation of a shift lever (not shown), a push rod 102 operated by the detent plate 100, a cam 104 formed at one end of the push rod 102 so as to move in a rectilinear direction along a guide 106 by the push rod 102, a parking sprag 108 which is pivotally mounted to a transmission housing (not shown) and contacts the cam 104 at its one end, and an annulus gear 112 having teeth 114 that engage a tooth 110 formed at the other end of the parking sprag 108 to lock the transmission.

Once the shift lever is manipulated to be located at P range, the push rod 102 moves in a rectilinear direction such that the cam 104 pushes up a proximal end of the parking sprag 108 and pushes down a distal end of the parking sprag 108. Accordingly, the parking sprag 108 is engaged with the annulus gear 112, thereby locking the transmission.

As described above, the conventional parking mechanism requires a large number of parts, i.e., the parking sprag, the annulus gear, the push rod, and the cam, etc. Furthermore, the number of parts occupies a lot of space so mounting problems occur.

Also, it is likely that the parking sprag can become disengaged from the annulus gear by an exterior impact when the vehicle is parked on a steep slope.

SUMMARY OF THE INVENTION

The present invention has been made in an effort to solve the above problems of the prior art.

It is an object of the present invention to provide an improved parking mechanism capable of minimizing space occupancy as well as whole manufacturing costs by reducing parts and ensuring reliable parking operation even on a steep slope.

To achieve the above object, a parking mechanism for an automatic transmission of the present invention comprises a manual control shaft rotationally supported by a transmission housing, the manual control shaft cooperating with a shift lever, a detent plate mounted on the manual control shaft, an annulus gear formed on a transfer gear of the transmission, and a sprag interposed between the detent plate and the annulus gear, the sprag levering on a fulcrum shaft which is fixed to the transmission housing.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
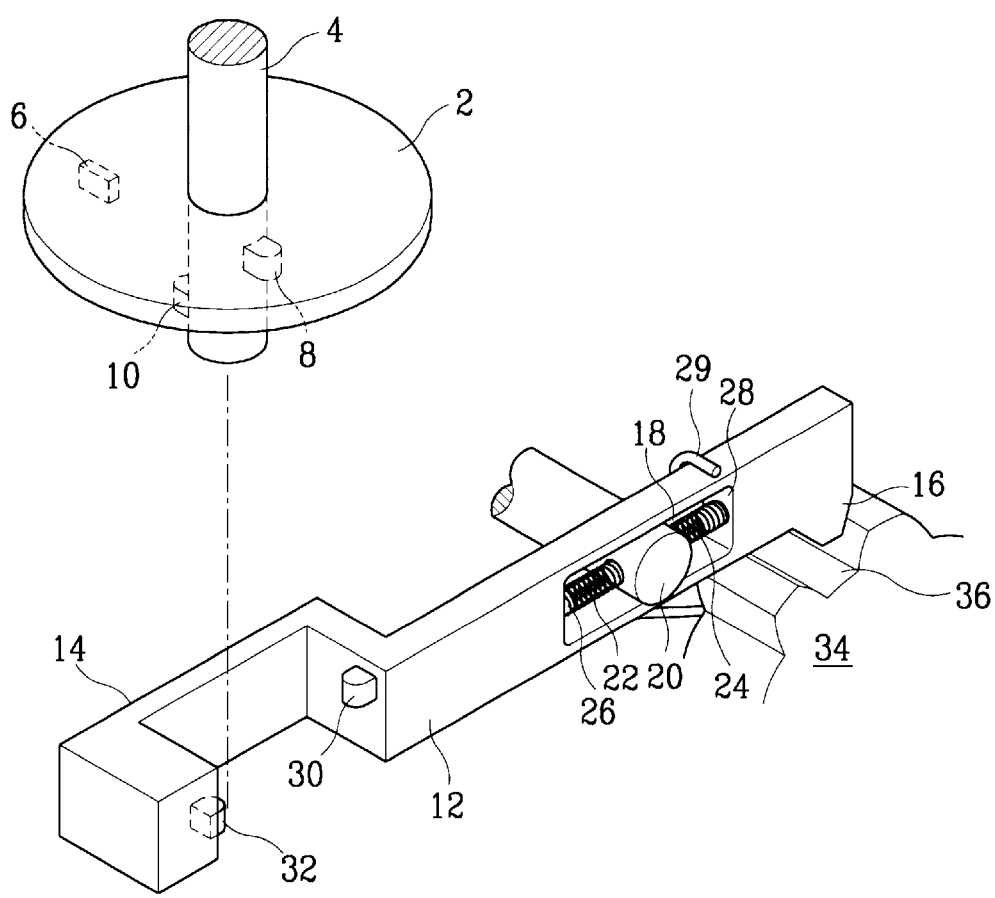
FIG. 1 is an exploded perspective view of a parking mechanism according to the preferred embodiment of the present invention.

FIG. 1 is an exploded perspective view of the parking mechanism according to the preferred embodiment of the present invention.

The parking mechanism of the present invention comprises a detent plate 2 formed with a manual control shaft 4 rotationally supported by a transmission housing (not shown) and responsively operated by a shift lever, and a sprag 12 interposed between the detent plate 2 and an annulus gear 34 such that the sprag 12 selectively engages the annulus gear 34 in response to the operation of the detent plate 2.

The detent plate 2 is provided with a detent cam 6 on a lower surface thereof for depressing one end of the sprag 12 during disengagement from the annulus gear 34, and the manual control shaft 4 is provided with two sprag support projections 8 and 10 formed on a lower part thereof under the detent plate 2. One 8 of the sprag support projections 8 and 10 is formed on an upper portion of the lower part of the manual control shaft 4 and the other support projection 10 is oppositely formed on a lower portion of the lower part of the manual control shaft 4.

The sprag 12 is provided with a U shaped-portion 14 formed at its one end portion to receive the lower portion of the manual control shaft 4, a hook projection 16 formed at the other end to lock the annulus gear 34, and a window 18 formed on the sprag 12.

The sprag 12 is provided with two hangers 30 and 32 respectively formed on opposite inner walls so as to selectively connect to the corresponding support projections 8 and 10 of the manual control shaft 4.

The window 18 is a rectangle opening that is longer in a longitudinal direction of the sprag 12 and has a pair of stoppers 26 and 28 each formed on either sidewall of the window 18 such that coil springs 22 and 24 are mounted around the stoppers 26 and 28. A fulcrum shaft 20 is inserted through the window 18 and connected with the coil springs 22 and 24 at opposite sides of the window such that the sprag 12 can move in a rectilinear direction and pivot on the axis of the fulcrum shaft 20 to some extent. Also, a torsion spring 29 is installed on the fulcrum shaft 20 so as to bias one end of the sprag 12 downward.

Figure 2:
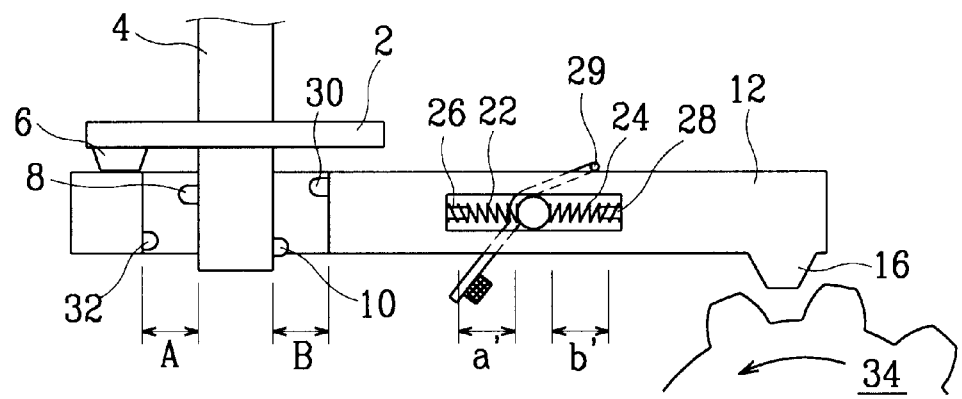
FIG. 2 is a front view of the parking mechanism of FIG. 1 while unlocked.

It is preferred that tolerant distances A and B in FIG. 2 from the manual control shaft 4 to both the sidewalls are equal to or greater than distances a' and b' from the fulcrum shaft 20 to the sidewalls of the window 18.

The operation of the parking mechanism according to the preferred embodiment of the present invention will be described hereinafter.

As shown in FIG. 2, the manual control shaft 4 is located in the center of the U shaped-portion 14 and the fulcrum shaft 20 is also located in the middle of the rectangle window 18 by a tensility of the coil springs 22 and 24 such that the detent cam 6 depresses one end of the sprag 12 for overcoming the elastic force of the torsion spring 29 which biases the hook projection 16 downward such that the hook projection 16 is maintained in a released position from the annulus gear 34.

Figure 3:
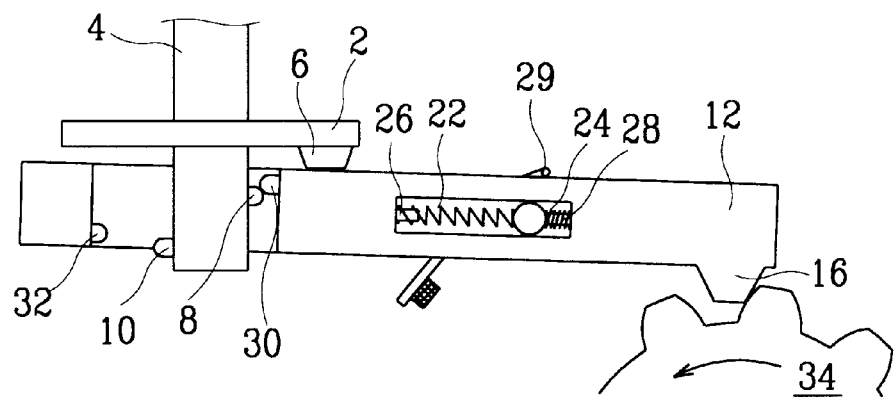
FIG. 3 is a front view of the parking mechanism of FIG. 1 while locked.

As shown in FIG. 3, once a shift lever (not shown) is manipulated to be located at P range for parking a vehicle, the detent plate 2 rotates such that the detent cam 6 releases depression of one end of the sprag 12, which causes the hook projection 16 of the sprag 12 to move down to be inserted between teeth of the annulus gear 34 resulting in locking of the annulus gear 34. In this case the sprag 12 experiences a force Fc on its right side portion in relation to the fulcrum shaft 20, which can be divided into forces Fa and Fb, by rotational momentum of the annulus gear 34. However, the movement of the sprag 12 is limited by the stopper 28 in relation to the force Fa and the sprag support projection 8 in relation to the force Fb. That is, if the sprag 12 is pushed by the force Fc, the sprag 12 moves as much as the distance b' such that the stopper 28 contacts the fulcrum shaft 20 and, at the same time, the sprag support projection 8 contacts the hanger 30 of the sprag 12. Furthermore, the detent cam 6 of the detent plate 2 assists the sprag support projection 8 by pushing down the sprag 12 such that the sprag 12 is fixed between the sprag support projection 8 and the detent cam 6. Accordingly, the sprag 12 is prevented from being disengaged from the annulus gear 34.

Figure 4:
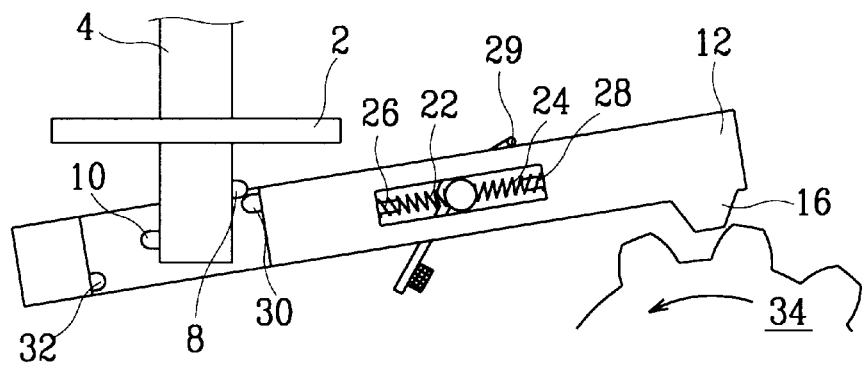
FIG. 4 is a front view of the parking mechanism of FIG. 1 while malfunctioning.

FIG. 4 shows a behavior of the parking mechanism while malfunctioning. If the sprag 12 is operated in mistiming, the hook projection 16 of the sprag 12 impacts an edge of one of the teeth of the annulus gear 34 such that the sprag support projection 8 is not hooked to the hanger 30. As a result, the hook projection 12 is engaged to a next tooth profile in the same manner as FIG. 3.

Figure 5:
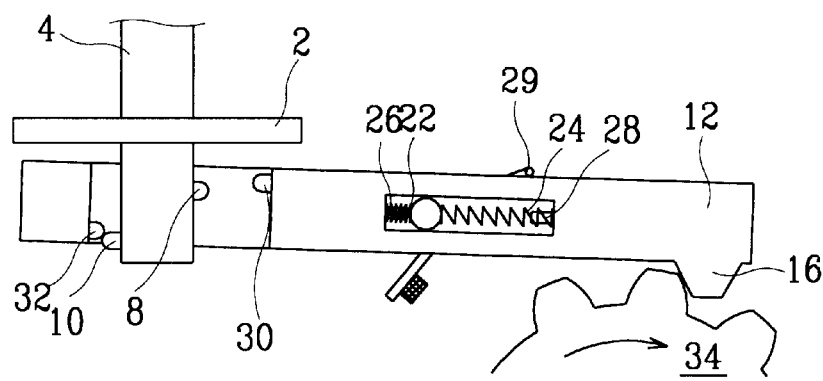
FIG. 5 is a front view of the parking mechanism of FIG. 1 while parking on an uphill slope.
Figure 5:
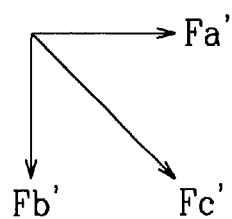
Figure 6:
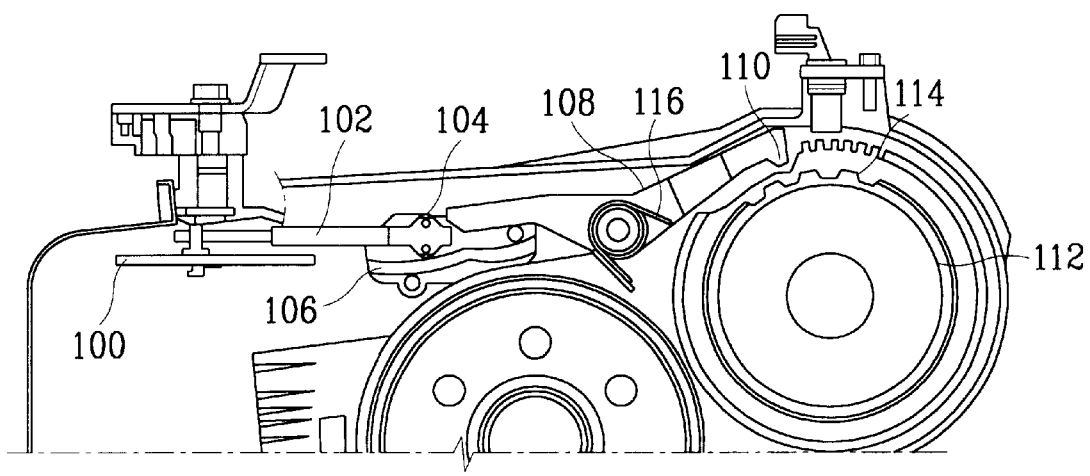
FIG. 6 is a schematic view of a conventional parking mechanism.
Figure 2:
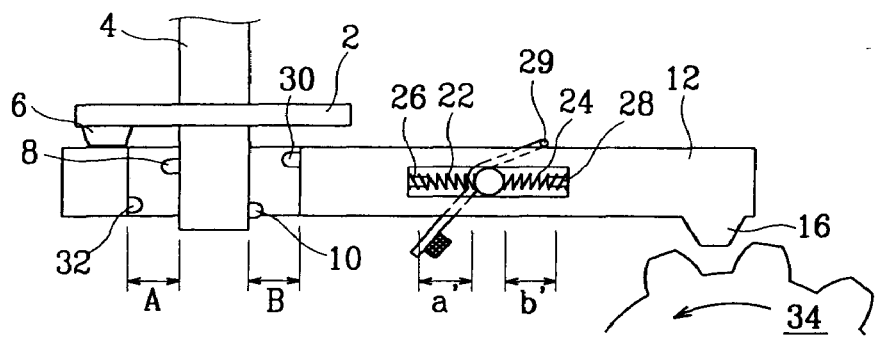
Figure 3:
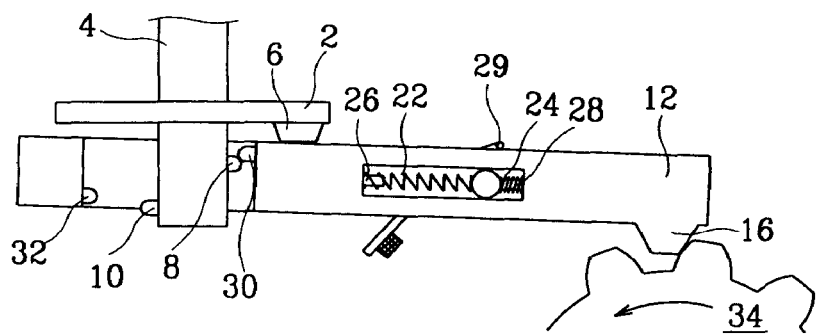
Figure 3:
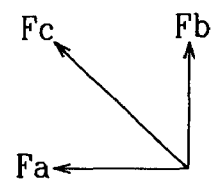

FIG. 5 shows a behavior of the parking mechanism while parking a vehicle on an uphill slope.

In this case, the annulus gear 34 rotates in the clockwise direction such that the sprag 12 is pulled by the rotational momentum of the annulus gear 34 while the hook projection 16 of the sprag 12 is engaged with the annulus gear 34. accordingly, the sprag 12 experiences a force Fc' on its left side portion in relation to the fulcrum shaft 20, which can be divided into forces Fa' and Fb', by rotational momentum of the annulus gear 34. However, the movement of the sprag 12 is limited by the stopper 26 in relation to the force Fa' and the sprag support projection 10 in relation to the force Fb'. That is, if the sprag 12 is pulled by the force Fc, the sprag 12 moves as much as the distance a' such that the stopper 26 contacts the fulcrum shaft 20 and, at the same time, the sprag support projection 10 contacts the hanger 32 of the sprag 12. Accordingly, the sprag 12 is prevented from disengaging from the annulus gear 34.

As described above, the parking mechanism of the present invention is simplified by using an integrated sprag and by eliminating parts such as a push rod, a cam, etc., such that the installed space occupancy is minimized and the whole manufacturing costs decrease.

Furthermore, since the sprag support projections of the detent plate and the hangers of the sprag are selectively interoperated for preventing the parking sprag from being disengaged from the annulus gear, the parking mechanism provides reliable parking, even on a steep slope.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A parking mechanism for an automatic transmission comprising:
   a manual control shaft rotationally supported by a transmission housing;
   a detent plate mounted on the manual control shaft;
   an annulus gear; and
   a sprag interposed between the detent plate and the annulus gear, the sprag pivoting on a fulcrum shaft which is fixed to the transmission housing, the sprag having a U-shaped portion that forms one end of the sprag for receiving a lower part of the manual control shaft, wherein the U shaped portion is provided with a pair of hangers formed inside opposite walls, the pair of hangers corresponding to first and second sprag support projections.

2. A parking mechanism of claim 1 wherein the first and second sprag support projections are formed on the lower part of the manual shaft under the detent plate, the first sprag support projection is formed on an upper portion of the lower part of the manual control shaft and the second sprag support projection is oppositely formed on a lower portion of the lower part of the manual control shaft.

3. A parking mechanism of claim 1 wherein the detent plate has a detent cam for depressing one end of the sprag to maintain a disengagement state of the sprag from the annulus gear.

4. A parking mechanism of claim 1 wherein the sprag has a hook projection protruded downward at another end of the sprag for selectively engaging with the annulus gear.

5. A parking mechanism of claim 1 wherein the first and second sprag support projections are formed on the lower portion of the manual control shaft under the detent plate.

6. A parking mechanism for an automatic transmission comprising:
   a manual control shaft rotationally supported by a transmission housing;
   a detent plate mounted on the manual control shaft;
   an annulus gear; and
   a sprag interposed between the detent plate and the annulus gear, the sprag pivoting on a fulcrum shaft which is fixed to the transmission housing, the sprag having a U-shaped portion that forms one end of the sprag for receiving a lower part of the manual control shaft, wherein the sprag is provided with a rectangular opening through which the fulcrum shaft is inserted.

7. A parking mechanism of claim 6 wherein each sidewall of the rectangular opening is provided with a stopper on which a coil spring is mounted.

8. A parking mechanism of claimed 7 wherein the spring is connected to the fulcrum shaft for balancing a position of the fulcrum shaft.

9. A parking mechanism of claim 6 wherein the sprag is connected to the fulcrum shaft by a torsion spring for biasing the hook projection of the sprag downward.

10. A parking mechanism of claim 6 wherein tolerant distance A and B between the manual shaft and each of sidewalls of the U-shaped portion are equal to or greater than distances a' and b' between the fulcrum shaft and each of sidewalls of the window.

11. A parking mechanism of claim 6 wherein the manual shaft comprises first and second sprag support projections formed on a lower part under the detent plate, the first sprag support projection is formed on an upper portion of the lower part of the manual control shaft and the second sprag support projection is oppositely formed on a lower portion of the lower part of the manual control shaft.

12. A parking mechanism of claim 6 wherein the detent plate has a detent cam for depressing one end of the sprag to maintain a disengagement state of the sprag from the annulus gear.

13. A parking mechanism of claim 6 wherein the sprag has a hook projection protruded downward at another end of the sprag for selectively engaging with the annulus gear.

14. A parking mechanism of claim 6 wherein the U shaped portion is provided with a pair of hangers formed inside opposite walls, which correspond to the sprag support projections.

* * * * *

UNITED STATES PATENT AND TRADEMARK OFFICE
CERTIFICATE OF CORRECTION

PATENT NO. : 6,467,600 B2
DATED : October 22, 2002
INVENTOR(S) : Lee

It is certified that error appears in the above-identified patent and that said Letters Patent is hereby corrected as shown below:

Drawings,
Figure 3, delete drawing sheet 2 and substitute the drawing sheet, consisting of Figs. 2 and 3, as shown on the attached page.

Signed and Sealed this

Thirtieth Day of May, 2006

JON W. DUDAS
*Director of the United States Patent and Trademark Office*